United States Patent [19]
Pfefferle

[11] 3,923,011
[45] Dec. 2, 1975

[54] APPARATUS AND METHOD

[75] Inventor: William C. Pfefferle, Middletown, N.J.

[73] Assignee: Engelhard Minerals & Chemicals Corporation, Murray Hill, N.J.

[22] Filed: May 31, 1972

[21] Appl. No.: 256,432

[52] U.S. Cl. ......... 123/1 R; 123/143 R; 123/191 A; 123/191 M; 123/143 B; 123/68; 60/39.52
[51] Int. Cl.² ......................................... F02B 75/12
[58] Field of Search ....... 123/191 A, 191 M, 191 R, 123/143 R, 32, 68, 33 H, 30 A, 143 B; 60/39.52, 276, 299

[56] References Cited
UNITED STATES PATENTS

| | | | |
|---|---|---|---|
| 1,564,906 | 12/1925 | Sokal | 123/143 R |
| 1,703,202 | 2/1929 | Moore | 123/191 A |
| 2,624,172 | 1/1953 | Houdry | 60/39.52 |
| 2,632,296 | 3/1953 | Houdry | 60/39.52 X |
| 3,441,381 | 4/1969 | Keith et al. | 60/276 |
| 3,444,098 | 5/1969 | Bottazi et al. | 123/191 A |
| 3,459,167 | 8/1969 | Briggs | 123/191 A |
| 3,481,317 | 12/1969 | Hughes et al. | 123/143 |
| 3,648,676 | 3/1972 | Lowman, Jr. | 123/191 R |
| 3,692,497 | 9/1972 | Keith et al. | 60/299 |

FOREIGN PATENTS OR APPLICATIONS

| | | | |
|---|---|---|---|
| 700,778 | 1/1931 | France | 123/191 A |

*Primary Examiner*—Charles J. Myhre
*Assistant Examiner*—R. H. Lazarus

[57] ABSTRACT

An internal combustion piston engine utilizing a catalyst to promote combustion and not requiring spark ignition. A catalyst member is provided within the engine cylinder. Air is supplied to the cylinder and is compressed by a piston. At or near the point of maximum compression, fuel is contacted with the catalyst, preferably from the side of the catalyst opposite the piston. The fuel and air mix to initiate combustion and the air-fuel mixture passes through the catalyst member, completing the combustion. The operation can result in relatively complete combustion of the fuel at a relatively low temperature of about 1800° to 3300° or 3500°F. so that little or no undesirable components are present in the engine exhaust, especially the exhaust may have a low content of nitrogen oxides.

14 Claims, 7 Drawing Figures

APPARATUS AND METHOD

The present invention pertains to an engine which employs a catalyst to effect combustion of a fuel. More particularly, the present invention pertains to an internal combustion engine for deriving power from a carbonaceous fuel and utilizing a catalyst to accomplish combustion, thereby reducing undesirable products in the engine exhaust. The fuel-air mixture undergoing combustion has a theoretical adiabatic flame temperature of about 1800° to 3300° or 3500°F., and yet due to the presence of the catalyst and its manner of use, such mixtures can be employed in a successful engine operation.

Internal combustion engines are utilized in numerous applications. By way of example, many automotive vehicles are powered by internal combustion engines. Numerous power plants used for such things as generation of electricity and pumping of fluids are powered by internal combustion engines. Many of these engines are of the type in which a carbonaceous fuel is burned, being ignited for example by means of a spark plug, to create a power stroke with the power transformed through mechanical means into the desired movement. Such engines generally operate under conditions which result in incomplete oxidation of the carbonaceous fuel and the generation of undesirable exhaust products. Ideally a fuel upon oxidation will be completely converted to carbon dioxide and water. In practice, in spark-ignition engines in particular, exhaust from internal combustion engines generally includes such undesirable products as incompletely burned fuel, carbon monoxide and various nitrogen/oxygen compounds which are generally referred to as NOX. In particular, the carbon monoxide and the NOX are harmful to plant and animal life. It is thus desirable to be able to reduce or eliminate these undesirable products from engine exhaust.

Ideally complete combustion of a carbonaceous fuel is more efficiently achieved with a stoichiometric mixture of the fuel and oxygen. A stoichiometric mixture, however, results in a high combustion temperature, and, in practice, particularly at high engine speeds, incomplete combustion of the fuel. Consequently, operation with an excess of oxygen is preferred since it reduces the combustion temperature, thereby reducing the generation of NOX, and since it increases the likelihood of complete combustion of the fuel, thereby reducing the quantity of unburned fuel and carbon monoxide in the exhaust. Even such fuel-lean operation, however, does not reduce the level of carbon monoxide, unburned fuel compounds, and NOX to acceptable levels until the system is so fuel-lean that engine operation is prevented. Operation with an excess of fuel likewise reduces the combustion temperature, thereby reducing the production of NOX. This fuel-rich operation increases the level of unburned fuel compounds and carbon monoxide in the exhaust, however. Recycling a portion of the exhaust to the combustion chamber dilutes the system and permits cooler operation, resulting in further combustion of the unburned fuel compounds and the carbon monoxide and reduction of the combustion temperature, thereby further reducing the level of NOX in the exhaust. This recycling unfortunately reduces engine performance and efficiency.

Engines have been developed in which fuel is introduced in a stratified layer, giving a fuel-rich zone near the spark plug surrounded by an excess of oxygen so that initial combustion takes place in the fuel-rich zone followed by continued combustion in a fuel-lean atmosphere and so at a lower temperature. Such engines are difficult to control, however, and engines of this type have been found to have exhaust with high NOX levels, although with low carbon monoxide and unburned hydrocarbon levels.

Catalytic reactors have been developed through which engine exhaust can be passed to complete the combustion of otherwise incompletely burned fuel compounds and of carbon monoxide. Generally such catalytic reactors, however, do not themselves reduce the NOX in the engine exhaust. Further steps can be taken in conjunction with catalytic reactors to reduce NOX, but these are costly and frequently reduce engine performance and efficiency. In addition, subsidiary equipment such as a pump is required to work in conjunction with a catalytic reactor, and completion of combustion of the fuel in the catalytic reactor wastes the energy from that portion of the fuel.

NOX compounds are generally produced during operation of the engine at high temperatures, for example temperatures in excess of 3300°F. Efficient operation of spark ignition internal combustion engines generally means operation at such high temperatures, and so the exhaust of spark ignition internal combustion engines generally includes undesirable quantities of NOX.

Efforts have been made to develop internal combustion engines utilizing a catalytic element to initiate combustion rather than utilizing spark ignition. Simple replacement of the spark ignition system with a catalyst element does not provide successful operation, however, since combustion of the air-fuel mixture takes place in the presence of the catalyst, with the result that expanding gases are acting on the piston, thereby preventing the return stroke of the piston. U.S. Pat. No. 2,632,296, issued Mar. 24, 1953 discloses an internal combustion engine in which air is supplied to a cylinder, compressed by a piston and passed from the cylinder to a catalyst chamber in which it is mixed with a fuel. Combustion takes place in the catalyst chamber, and the resulting expanding gases are passed back to the cylinder to power the piston during its return stroke. This apparatus, however, requires elaborate valving and connections with a resultant loss in power. In addition, the air-fuel mixture and the resulting gases pass but once through the catalyst material, and during that one pass the gases are under considerable pressure so that they pass rapidly. As a consequence it is likely that the combustion is not so complete as might be desired.

The present invention is an internal combustion engine and a method of its operation in which combustion is accomplished by use of a solid catalyst without the requirement for a spark. As a consequence and by control of the fuel-air ratio, combustion takes place at a relatively low temperature, thereby reducing the generation of NOX without the necessity of inert gas dilution or operation on fuel-rich mixtures of fuel and air. In addition, in preferred embodiments of the present invention, the air-fuel mixture undergoing combustion repasses through the catalyst material one or more times, and so the catalyst more fully aids in the complete combustion of the fuel, thereby reducing the quantity of carbon monoxide and unburned fuel in the exhaust.

In accordance with the present invention, within the cylinder of an internal combustion, piston engine there is provided an oxidation catalyst material. An oxygen-containing gas such as air is introduced into the cylinder and is compressed by the piston. A carbonaceous fuel is introduced so that it contacts the catalyst near the end of the compression stoke, preferably prior to or at the approximate point of maximum compression, for example at some piston position between a point about 30° before maximum compression based on crank rotation and the point of maximum compression. The presence of the fuel and the oxygen-bearing gas in contact with the catalyst results in combustion of the fuel. During the resulting power stroke the burning gases pass in contact with the catalyst, and during the subsequent exhaust stroke in the case of a suitable design the gases again pass in contact with the catalyst, thereby insuring lower emissions of hydrocarbons and carbon monoxide. As a consequence, little or no unburned fuel components and carbon monoxide may be present in the exhaust. Since the combustion is initiated by the oxidation catalyst rather than by a spark, it is possible to use a ratio of fuel to air so that the combustion takes place at a relatively low temperature and little or no NOX is generated. Since the combustion is catalytic it can still be efficiently conducted at these fuel-air ratios. Moreover, since there is little, if any, fuel in the cylinder in contact with the catalyst during the major portion of the compression stroke, premature combustion can be avoided.

An engine in accordance with the present invention does not require close control of the stoichiometry for purposes of obtaining adequate combustion, so long as the temperature is sufficient to cause operation of the catalyst. Preferably, a large stoichiometric excess of oxygen is provided to ensure operation at a reduced combustion temperature, and as a result there is little or no unburned fuel or carbon monoxide in the exhaust; in other words, substantially complete combustion of the carbonaceous fuel to carbon dioxide is effected. An engine in accordance with the present invention is capable of efficient operation at temperatures in the range of about 1800° to 3300°F. or 3500°F. The temperature within the combustion chamber need be only enough to maintain combustion in the presence of the oxidation catalyst. Combustion temperatures below about 2000°F. can be utilized, and temperatures in the order of about 2000° to 3000°F. are preferred. Air-fuel mixtures having theoretical adiabatic flame temperatures in the range of from about 1800° to 3300°F. or 3500°F., and preferably from about 2000°F. to about 3000°F. are utilized. Pre-ignition is avoided in engines in accordance with the present invention, even in engines of a very high compression ratio, since the majority of the compression takes place with no fuel in contact with the catalyst.

Combustion heat during operation of the engine maintains the catalyst at operational temperatures where the catalyst serves to promote the desired oxidation. Compression of the air raises its temperature, and the rise may be sufficient to start the engine. If needed, at initial start-up an electrical glow plug or other heat source can be activated within the combustion zone to ensure that the necessary catalyst-activating temperatures are achieved.

At the present time automotive engines operate with close to a stoichiometric mixture of oxygen and fuel which is provided, for example, by utilization of an air/fuel weight ratio in the order of 14.5 : 1. In contrast, an engine in accordance with the present invention typically might operate with a fuel-lean mixture having an air/fuel weight ratio of at least about 20 : 1, preferably at least about 25 : 1. Due to the high air/fuel ratio, close control of the air/fuel proportioning or stoichiometry is not required for low temperature operation, and a stratified charge is not necessary.

In the operation of an internal combustion engine in accordance with the present invention, fuel is oxidized or combusted in contact with free or molecular oxygen which is supplied, for the most part, by air, although the combustible mixture may be enriched by addition of more concentrated forms of oxygen or diluted by addition of nitrogen or other essentially inert gases. The non-fuel components of the combustible mixture are generally referred to herein as air.

The fuels employed in this invention contain carbon and thus are termed carbonaceous. These fuels have sufficiently high energy that when oxidized with a stoichiometric amount of air they exhibit an adiabatic flame temperature of at least about 3300°F. While the preferred fuels include the type usually burned in spark-ignition engines and commonly referred to as "gasoline", the fuels in general may be gaseous or liquid at ambient conditions and in addition to gasoline are exemplified by, for instance, methane, ethane, propane, and other low molecular weight hydrocarbons. Other normally liquid hydrocarbons, such as kerosene, and the various distillate mineral oils may be used with less advantage. Carbonaceous fuels such as alkanols of 1 to 4 carbon atoms, and other materials containing combined oxygen would also be useful fuels. The fuel may occur or be obtained in admixture with components which are essentially inert in the oxidation system.

In a typical engine the oxidation catalyst is preferably positioned within the cylinder closely adjacent the piston at maximum compression, leaving clearance between the catalyst and the piston in this piston position. Preferably the major portion of the gases in the cylinder at maximum compression are on the side of the catalyst opposite the piston, and it is into this zone that the fuel is introduced. As a consequence, movement of the piston from this maximum compression position during the power stroke passes the oxidizing air-fuel mixture past or through the catalyst. The cylinder exhaust line preferably communicates with the cylinder on the piston side of the catalyst so that the gases within the cylinder pass a second time in contact with the catalyst as the cylinder is exhausted. If desired, the fuel can be introduced adjacent the piston at or near the beginning of the compression stroke, with the major portion of the air being between the fuel and the catalyst. During the compression stroke, the air passes through the catalyst, and at or near the end of the compression stroke the fuel, in admixture with air, contacts the catalyst and combustion is initiated.

The oxidation catalyst used in the engine of the present invention can have various forms and compositions and can be one of the types used or generally known in the art to oxidize fuels in the presence of molecular oxygen. The catalyst can be in the form of relatively small, solid particles of various sizes and shapes, often in sizes below about 1 inch in the largest dimension, with a plurality of such particles being arranged together to form one or more catalyst masses or beds in the combustion zone. The catalyst is much preferably of larger form and has a skeletal structure with gas flow paths therethrough. The unitary or honey-comb type catalysts are examples of this preferred form. The catalysts generally have one or more metal components which are catalytically-active towards promoting the desired oxidation reactions, and in view of the rather high temperatures at which the catalysts used in this invention operate, materials normally considered to be relatively inactive or insufficiently active, to promote adequately the oxidation of the fuel, may be suitable. The catalytic metal may be in a combined form, such as an oxide, rather than being solely in the elemental state, and preferably the catalytic metal compound is carried by a less catalytically-active, or even an essentially inert, support which may be, for instance, ceramic in nature. In these catalysts, the more catalytically-active metal component is often a minor amount of the catalyst, while the support is the major proportion. The catalytically-active metals are often in the heavy metal groups of the periodic chart of the elements, and thus in group IB, IIB, III to VIII, or the lanthanide series. The catalytically-active forms of these metals are used, and the oxides of a given metal, e.g. aluminum, may be more active or less active depending on its physical state, degree of hydration and other factors as is known in the art. Generally speaking, however, the catalytic components of the metals of groups III or IV, for instance, silica, alumina, zirconia and their mixtures, are less active than the catalytic forms of the group VIII metals, particularly in platinum group metals, such as platinum, palladium and rhodium; or the metals of groups IB, IIB, V to VIII or rare earths, e.g. Cu, Ni, Co, V, Fe, Ce, and the like. In some preferred forms, the catalysts used may be composed of both a more active component having one or more metals from groups IB, IIB or V to VIII along with one or more less catalytically-active components of metals from groups III or IV, and these combination may or may not, but preferably are, supported on a still less active, and even essentially inert, carrier. For example, such a catalyst may contain 1% platinum in active form and 10% alumina in active form carried on a honeycomb alpha-alumina or cordierite support, or the platinum may be replaced by minor amounts of chromium and cerium oxides. Another useful and preferred catalyst support material is silicon nitride. The catalysts often have a surface area, including the area of pores in the surface, of at least about 10, preferably at least about 50, square meters per gram.

The unitary, skeletal structure support type of oxidation catalyst can be characterized by having a plurality of flow channels or paths extending therethrough in the general direction of gas flow. The flow channels need not pass straight through the catalyst structure and may contain flow diverters or spoilers. The skeletal structure support is preferably constructed of a substantially chemically inert, rigid, solid material capable of maintaining its shape and strength at high temperatures, for instance up to about 4000°F. or more. The support may have a low thermal coefficient of expansion, good thermal shock resistance, and low thermal conductivity. Often the skeletal support is porous but its surface may be relatively non-porous, and it may be desirable to roughen its surface so that it holds the catalyst coating better, especially if the support is relatively non-porous. The support may be metallic or ceramic in nature or a combination thereof.

The channels or flow paths through the unitary body or skeletal structure can be of any shape and size consistent with the desired superficial surface and should be large enough to permit relatively free passage of the gas mixture. The channels may be parallel, or generally parallel, and extend through the support from one side to an opposite side, such channels being separated from one another by preferably thin walls. The channels may also be multi-directional and may even communicate with one or more adjacent channels. The channel inlet openings can be distributed across essentially the entire face or cross-section of the support subject to initial contact with the gas to be oxidized.

For a more complete understanding of the present invention, reference is made to the following detailed description of preferred embodiments, together with the accompanying drawings and the appended claims. In the drawings:

Figures 1A, 1B, 1C, 1D:
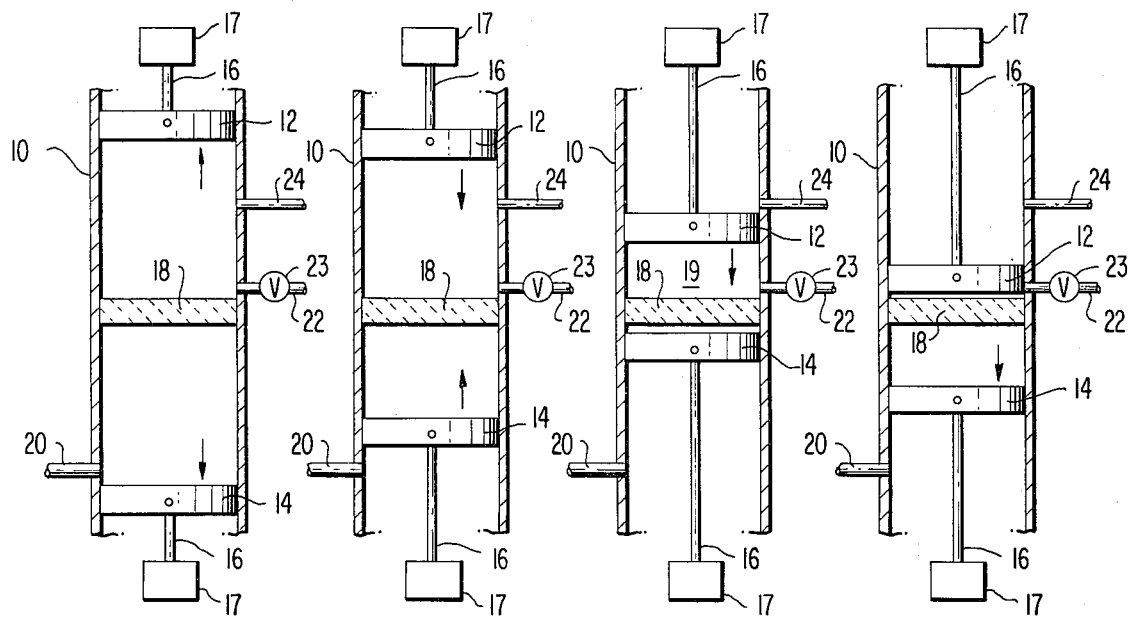
FIGS. 1A-1D illustrate various stages in the operation of a two-cycle, opposed-piston engine in accordance with the present invention.

FIGS. 1A-1D depict a cylinder 10 having a piston 12 at its first end and a piston 14 at its second end. Pistons 12 and 14 are fitted with piston rings to provide a substantially fluid-right seal as the pistons move within cylinder 10. Pistons 12 and 14 are adapted for reciprocating movement within cylinder 10, and each piston 12 and 14 is connected by a piston rod 16 to mechanical coupling mechanism 17 which converts the reciprocal motion to the desired form of movement. Such mechanical coupling mechanisms, by way of example, might include a crankshaft and appropriate camming devices to convert the reciprocal motion of the pistons into rotary motion, as is well known in the art.

Oxidation catalyst member 18 is substantially centrally located in cylinder 10 within combustion zone 19 defined between pistons 12 and 14. Catalyst member 18 is preferably a honeycomb construction as set forth above. Cylinder 10 is provided with an air inlet line 20, fuel inlet line 22 having valve 23 therein, and an exhaust line 24.

Pistons 12 and 14 are slightly out of phase so that, as is evident particularly in FIG. 1C, when piston 14 is approximately at its top dead center position adjacent catalyst member 18, piston 12 has not yet reached such position, and as illustrated in FIG. 1D when piston 12 is approximately at its top dead center position adjacent catalyst member 18, piston 14 has passed beyond that position and is moving away from catalyst member 18. Movement of pistons 12 and 14 from the position of FIG. 1C to the position of FIG. 1D is simply piston displacement with essentially no change in the volume between pistons 12 and 14. Pistons 12 and 14 are maintained in the proper phase relationship by a mechanical linkage, for example within mechanical coupling mechanisms 17.

Operation of the engine of FIG. 1 in accordance with the present invention begins with the introduction of oxygen into cylinder 10. Thus, with pistons 12 and 14 near their low dead center positions, as depicted in FIG. 1A, air inlet line 20 is open and, if desired, exhaust line 24 is also open. Air therefore enters cylinder 10 through line 20 to scavenge the gas remaining in the cylinder from its last cycle of operation. As illustrated in FIG. 1B, during the subsequent compressive movement, pistons 12 and 14 both move toward catalyst member 18. If exhaust line 24 is not valved, air is exhausted through line 24 to complete the scavenging of cylinder 10. Once air can no longer pass through exhaust line 24, either due to closure of an exhaust valve or due to passage of piston 12 beyond exhaust line 24, the air remaining in cylinder 10 is compressed. At or near the point of maximum compression, valve 23 is actuated to introduce a measured amount of fuel into cylinder 10 through fuel line 22. At this point of maximum compression, as illustrated in FIG. 1C, piston 14 is at its top dead center position adjacent catalyst member 18 while piston 12 is not yet at its top dead center position and so is further from catalyst member 18. Consequently, the majority of the air in cylinder 10 is on the side of catalyst member 18 adjacent piston 12. It is to this larger volume side of catalyst member 18 that fuel has been introduced by fuel line 22.

Having reached its top dead center position, piston 14 commences its return stroke. Piston 12, in the meantime, is still approaching its top dead center position adjacent catalyst member 18. The volume between pistons 12 and 14 remains substantially constant until piston 12 reaches its top dead center position, and the air-fuel mixture and combustion gas within cylinder 10 are moved by the movement of pistons 12 and 14, causing the mixture to pass through catalyst member 18 so that substantially complete combustion takes place. Compression of the air during the compressive movement has raised its temperature to a temperature at which catalyst member 18 is effective to cause combustion of the air-fuel mixture as it passes through the catalyst member, and in some instances to a temperature sufficient to initiate combustion prior to contact with catalyst member 18.

Once piston 12 has reached its top dead center position adjacent catalyst member 18, as depicted in FIG. 1D, and substantially all of the air-fuel mixture and combustion gas have passed through the catalyst member, piston 12 commences its return power stroke. At this point the gas within cylinder 10 is expanding rapidly due to the combustion of the air-fuel mixture, and so power is imparted through pistons 12 and 14, piston rods 16 and mechanical coupling mechanisms 17 to the utilizing equipment. Preferably, piston 12 clears exhaust line 24 while there is still some pressure within cylinder 10 to aid in the exhausting of the combustion product gas through outlet line 24. Once piston 14 has cleared air inlet line 20, scavenging again takes place. Between the point at which piston 12 is at its top dead center position and the completion of scavenging, all the gas within combustion zone 19 has again passed through catalyst member 18, providing further assurance that combustion is essentially complete. When it is desired to stop operation of the engine, valve 23 is controlled to stop the flow of fuel through fuel inlet line 22.

Figure 2:
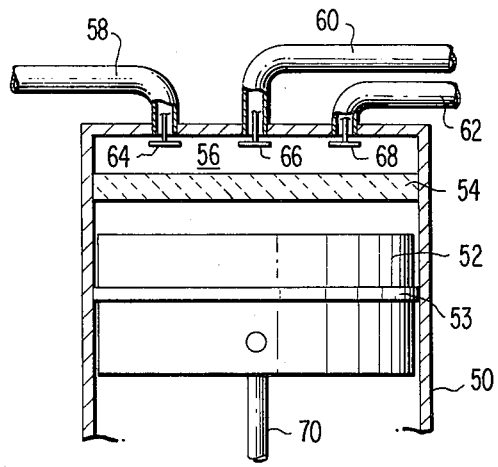
FIG. 2 illustrates a four-cycle, single-acting-piston engine in accordance with the present invention.

FIG. 2 illustrates a cylinder 50 of a four-cycle engine and having therein piston 52 including piston ring 53. Catalyst member 54 is provided in combustion zone 56 defined adjacent the top of cylinder 50. Air inlet line 58, fuel inlet line 60, and exhaust line 62 communicate with combustion zone 56 on the side of catalyst member 54 opposite piston 52. Lines 58, 60 and 62 are valved by valves 64, 66 and 68, respectively, under control of appropriate linkages. In operation, valve 64 is opened to admit air into cylinder 50, while valves 66 and 68 are closed, as piston 52 moves from its top dead center position. After the proper quantity of air has entered cylinder 50, valve 64 closes. During the subsequent compressive movement of piston 52 toward catalyst member 54, the air is compressed. In the latter portion of this compressive movement, at or near the top dead center position of piston 52, valve 66 opens to admit a measured amount of fuel into combustion zone 56, following which valve 66 closes. Catalyst member 54 initiates combustion of the air-fuel mixture on contact. The resulting expanding combustion gases impart power through piston 52 and piston rod 70 during the subsequent power stroke of piston 52. This power movement of piston 52 draws the air-fuel mixture and the expanding combustion gases through catalyst member 54, ensuring that substantially complete combustion takes place. During the fourth stroke of the cycle, as piston 52 returns to its top dead center position, exhaust valve 68 is opened to exhaust the combustion product from cylinder 50. During this exhaust stroke the major portion of the combustion gases again pass through catalyst member 54, providing further assurance that combustion is substantially complete. If desired, air inlet valve 64 can open near the end of the exhaust stroke to scavenge cylinder 50. It may be deemed desirable to have air inlet line 58 communicate with cylinder 50 beneath catalyst member 54 to enhance this scavenging. After the exhaust stroke, cylinder 50 is ready for another air inlet stroke to commence another cycle.

Figure 3:
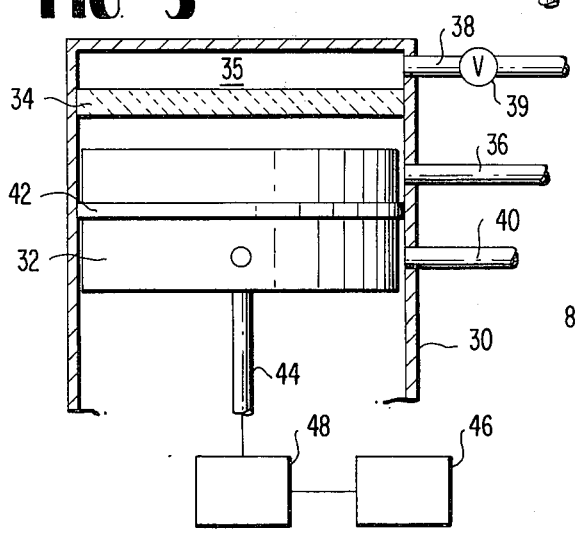
FIG. 3 illustrates a two-cycle, single-acting-piston engine in accordance with the present invention.

FIG. 3 depicts cylinder 30 from a two-cycle engine and having single-acting piston 32 therein. Catalyst member 34 is provided in combustion zone 35 defined near the top of cylinder 30, between the cylinder and reciprocating piston 32. Air inlet line 36 is provided beneath catalyst member 34, while fuel inlet line 38, including control valve 39, is provided above catalyst member 34. Exhaust line 40 is provided at some distance beneath catalyst member 34. Piston 32 is illustratively depicted as including a piston ring 42 to provide a seal as piston 32 moves within cylinder 30. Piston rod 44 connects piston 32 to utilization equipment 46 through mechanical coupling mechanism 48.

Operation of a two-cycle engine incorporating cylinders of the type depicted in FIG. 3 commences with piston 32 beneath air inlet line 36 to permit the introduction of air through line 36 and into cylinder 30. Piston 32 then moves upwardly in compressive movement to compress the air. During the latter portion of this compressive movement, when piston 32 is near its top dead center position, fuel is introduced by valve 39 through fuel line 38. Catalyst member 34 initiates combustion of the air-fuel mixture. Downward movement of piston 32 draws the fuel-air mixture and combustion gas through catalyst member 34, ensuring that substantially complete combustion takes place. Once piston ring 42 has cleared exhaust line 40, the combustion product is exhausted, and introduction of air through line 36 scavenges cylinder 30. If desired, rather than having exhaust line 40 at a distance from catalyst element 34 and on the same side of the catalyst element as is piston 32, so that passage of gas through the exhaust line is controlled by the position of piston 32, a valved exhaust line can be provided on the opposite side of catalyst element 34. Then, the valved exhaust line is opened as piston 32 approaches its low dead center position to exhaust the combustion product from cylinder 30. On the initial introduction of air into cylinder 30 and movement of piston 32 back to its top dead center position, scavenging takes place, and then the valved exhaust line is closed, and compression of the air takes place. This configuration causes the gases within cylinder 30 to be drawn once through catalyst member 34 during power movement of piston 32 from top dead center and to be passed back through catalyst member 34 as piston 32 returns to top dead center, thereby increasing the assurance of achieving substantially complete combustion.

Preferably, in engines in accordance with the present invention the fuel is injected into the cylinder before the point of maximum compression. By way of example, in cylinder 30 of FIG. 2, fuel injection preferably takes place within about 30° of crankshaft rotation from the point of top dead center and, again preferably, as piston 32 is moving toward top dead center and approaching maximum compression. If fuel injection takes place after the point of maximum compression, there is generally a reduction in fuel economy and efficiency, with the result that an undesirable level of pollutants may be present in the engine exhaust. The exact point of optimum fuel injection depends on numerous individual characteristics of the engine involved, including, inter alia, the number of cylinders.

Preferably, as illustrated in the case of the opposed piston engine by FIG. 1C, the fuel is injected on but one side of catalyst member 18, and during subsequent displacement to the position of FIG. 1D substantially all of the air-fuel mixture passes through catalyst member 18 before expansion takes place, thereby causing initial combustion to occur before expansion and thus increasing the efficiency of the engine. Preferably, also, as the engine is just passing the point of maximum compression, the majority of the air-fuel mixture is on the side of the catalyst away from the piston. Thus for example, in FIG. 1D, cylinder 10 is ready to pass the point of maximum compression, and piston 12 is about to leave its top dead center position adjacent catalyst member 18. The majority of the air-fuel mixture is on the opposite side of catalyst member 18, being between catalyst member 18 and piston 14. The movement of piston 12 away from its top dead center position draws a substantial portion of this air-fuel mixture through catalyst member 18, and the remaining portion is caused to pass through catalyst member 18 during the exhaust and scavenging of cylinder 10. Even if some unburned fuel compounds or carbon monoxide remain after initial combustion, on this second passage through catalyst member 18 the unburned fuel compounds and carbon monoxide are generally burned to carbon dioxide and water. Likewise, in the engines of FIG. 2 and 3 when the piston is at its top dead center position, it is immediately adjacent the catalyst member so that the majority of the air-fuel mixture is on the side of the catalyst member opposite the piston. Movement of the piston after this point of maximum compression then draws the air-fuel mixture through the catalyst member. Preferably, the volume on the side of the catalyst member opposite the piston which is at its top dead center position is at least about two, preferably at least about four times the volume between that piston and the catalyst member, and in fact on the piston side of the catalyst member there need be provided only space enough for clearance of the piston at its top dead center position.

Figure 4:
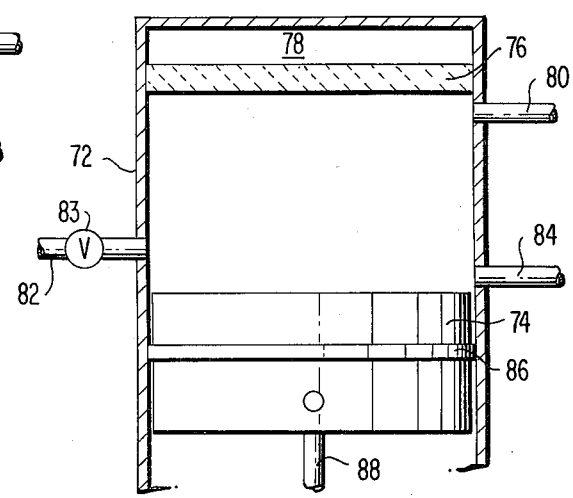
FIG. 4 illustrates a modified form of two-cycle single-acting-piston engine in accordance with the present invention.

While the introduction of fuel at or near the end of the compression stroke results in initiation of combustion at the desired point, the fuel can be introduced adjacent the piston at or near the beginning of the compression stroke. FIG. 4 depicts cylinder 72 from a two-cycle engine and having single-acting piston 74 therein. Catalyst member 76 is provided in combustion zone 78 defined near the top of cylinder 72. Air inlet line 80 is provided adjacent catalyst member 76 and beneath the catalyst member. Fuel inlet line 82, having valve 83, and exhaust line 84 are provided at some distance beneath catalyst member 76 so that they communicate with the interior of cylinder 72 when piston 74 is at or near its low-dead-center position. Exhaust line 84 communicates at a position closer to the low-dead-center position of piston 74 than does fuel inlet 82. Piston 74 is provided with piston rod 88, which connects to utilization equipment, and preferably with piston ring 86.

In operation, with cylinder 72 exhausted, as piston 74 moves downwardly clearing air inlet line 80, air is introduced into cylinder 72. When piston 74 has passed its low-dead-center position and has returned from that position to close exhaust line 84, valve 83 is actuated to introduce fuel into cylinder 72. Since fuel inlet line 82 communicates with the interior of cylinder 72 adjacent piston 74 when the piston is near its low-dead-center position, a considerable volume of air is between the fuel and catalyst member 76. During the compression stroke of piston 74, this air passes through catalyst member 76 and prevents contact of the fuel with the catalyst member until piston 74 is at or near its top-dead-center position. Illustratively, the contact of the fuel with catalyst member 76 takes place when piston 74 is within 30° of its point of maximum compression. Catalyst member 76 then initiates combustion of the air-fuel mixture. If piston 74 has not yet reached its top-dead-center position, the continued compression causes the air-fuel mixture to pass through catalyst member 76, effecting combustion of the mixture. The expanding combustion gases act on piston 74 during the subsequent power stroke. As piston 74 moves from catalyst member 76, the gases within combustion zone 78 are drawn back through the catalyst member, giving further opportunity for substantially complete combustion to take place. Once piston ring 86 has cleared exhaust line 84, the combustion product is exhausted, and introduction of air through line 80 scavenges cylinder 72.

It is thus seen that in accordance with the present invention there is provided an internal combustion piston engine not requiring spark ignition but instead utilizing a catalyst to promote combustion and with control of the fuel-air ratio, with the result that more complete combustion takes place and the combustion occurs at a lower temperature so that the engine exhaust has little or no undesirable components. Especially the exhaust is low in NOX. Although the present invention has been disclosed with reference to preferred embodiments, numerous rearrangements, alterations and substitutions could be made, and still the result would be within the scope of the invention.

What is claimed is:

1. In an internal combustion engine including a cylinder, piston means arranged for reciprocation within the cylinder and cooperating therewith to define a compression zone which is compressed as the piston means moves in a compression stroke from a minimum compression position to a maximum compression position, inlet means for supplying combustion-oxygen-bearing air and carbonaceous fuel to the cylinder, and exhaust means for exhausting combustion product gas from the cylinder, the improvement comprising:
- oxidation catalyst means disposed in said cylinder at a location which is within the compression zone when said piston mens is in said maximum compression position,
- said catalyst means having gas flow paths therethrough to permit flow therethrough of gases within said cylinder, and
- said catalyst means being effective during operation to initiate combustion of a fuel-lean mixture of carbonaceous fuel and air passing in contact therewith at a temperature below 3500°F; with resultant substantially complete combustion to carbon dioxide of said fuel
- and control means associated with said inlet means for supplying air to said compression zone for compression during each piston compression stroke, and for supplying carbonaceous fuel to the compression zone during each compression stroke at a predetermined time, cooperating with the disposition of said inlet means carrying said fuel to the cylinder, to effect contact of said fuel with said oxidation catalyst means at a time commencing with the latter portion of each compression stroke,
- said control means being adjustable to supply a sufficient total quantity of air, relative to the quantity of said carbonaceous fuel, to give an air:fuel weight ratio of at least about 20:1 and to provide for passage in contact with said oxidation catalyst means of a fuel-lean combustible air-fuel mixture with a theoretical adiabatic flame temperature in the range of from about 1800°F to about 3500°F.

2. An internal combustion engine as claimed in claim 1 in which said piston means comprises a single-acting piston.

3. An internal combustion engine as claimed in claim 2 in which the engine is a four-cycle engine.

4. An internal combustion engine as claimed in claim 1 in which said catalyst means has a honeycomb structure permitting gas flow therethrough.

5. An internal combustion engine as claimed in claim 5 in which said catalyst means has a support structure formed of silicon nitride.

6. An internal combustion engine as claimed in claim 1 in which said control means is adjusted to provide an air/fuel weight ratio of at least about 25:1.

7. An internal combustion engine as claimed in claim 1 in which said inlet means includes air inlet means and fuel inlet means, and said catalyst means and each of said air inlet means, fuel inlet means, and exhaust means are positioned to cause gases within said cylinder to pass through said oxidation catalyst means as said piston means moves from said maximum compression position to said minimum compression position and to return through said oxidation catalyst means toward said exhaust means as said piston means moves from the said minimum compression position to the said maximum compression position.

8. An internal combustion engine as claimed in claim 1 in which said inlet means and said control means are arranged and adjusted to supply fuel to the cylinder adjacent said oxidation catalyst means only during the latter portion of the piston means compression stroke.

9. An internal combustion engine as claimed in claim 9 in which said inlet means supplies fuel to the cylinder only when said piston means is within about 30° of crankshaft rotation of the position of maximum compression.

10. The method of operation of an internal combustion engine having a cylinder and piston means arranged for reciprocation therewithin, comprising:
- providing an oxidation catalyst in said cylinder at a location which is within the compression zone remaining in said cylinder when said piston means is in maximum compression position at the end of the compression stroke,
- said catalyst having gas flow paths therethrough and being capable of effecting substantially complete combustion to carbon dioxide of a fuel-lean mixture of carbonaceous fuel and air passing in contact therewith at a temperature below 3500°F complete combustion to carbon dioxide of said fuel;
- passing combustion-oxygen-bearing air into the cylinder;
- compressing the air in the cylinder during the compression stroke;
- introducing carbonaceous fuel into the cylinder during the compression stroke at a predetermined time and with predetermined flow paths within the compression zone for effecting contact of the fuel with the oxidation catalyst at a time commencing with the latter portion of the compression stroke to cause combustion of the fuel and power movement of the piston means;
- controlling the total amount of air passed into the cylinder and the relative amount of fuel introduced into the cylinder to provide an air:fuel weight ratio of at least about 20:1, the air-fuel mixture having a theoretical adiabatic flame temperature in the range of from about 1800°F to about 3500°F;
- and exhausting combustion products from the cylinder.

11. A method as claimed in claim 11 in which the air/fuel weight ratio of said mixture is controlled to be at least about 25:1.

12. A method as claimed in claim 11 in which said air:fuel ratio is controlled to provide an air-full mixture having a theoretical adiabatic flame temperature in the range of from about 2000°F to 3000°F.

13. A method as claimed in claim 11 in which the carbonaceous fuel is introduced into the cylinder only during the latter portion of said compression stroke.

14. A method as claimed in claim 14 in which the carbonaceous fuel is introduced into the cylinder within about 30° of crankshaft rotation at the position of maximum compression.

* * * * *

UNITED STATES PATENT AND TRADEMARK OFFICE
CERTIFICATE OF CORRECTION

PATENT NO. : 3,923,011

DATED : December 2, 1975

INVENTOR(S) : William C. Pfefferle

It is certified that error appears in the above-identified patent and that said Letters Patent are hereby corrected as shown below:

In column 5, line 27, "particularly in" should read --particularly the--.

In column 5, line 35, "these combination" should read --these combinations--.

In column 6, line 28, "fluid-right seal" should read --fluid-tight seal--.

In column 10, line 13, "fuel inlet 82" should read --fuel inlet line 82--.

In column 11, line 4, "mens" should read --means--.

In column 11, line 43, delete "5" and substitute --4--.

In column 11, line 58, after "from" delete "the".

In column 11, line 58, after "to", at the end of the line delete "the".

In column 12, line 7, delete "9" and substitute --8--.

In column 12, lines 20-21, delete "capable of effecting substantially complete combustion to carbon dioxide" and substitute --effective during operation to initiate combustion--.

In column 12, line 45, delete "11" and substitute --10--.

In column 12, line 48, delete "11" and substitute --10--.

In column 12, line 49, before "mixture", delete "air-full" and substitute --air-fuel--.

In column 12, line 52, delete "11" and substitute --10--.

In column 12, line 55, delete "14" and substitute --13--.

In column 12, line 23, after "below 3500°F" and before "complete" add --with resultant substantially--.

Signed and Sealed this twentieth Day of April 1976

[SEAL]

Attest:

RUTH C. MASON
Attesting Officer

C. MARSHALL DANN
Commissioner of Patents and Trademarks